Sept. 22, 1959 W. M. WAKELEY 2,905,804
MAGNETIC FORCE WELDING MACHINE
Filed Jan. 11, 1957 2 Sheets-Sheet 1

INVENTOR.
WILLIAM M. WAKELEY
BY
John W. Michael
ATTORNEY.

Sept. 22, 1959 W. M. WAKELEY 2,905,804
MAGNETIC FORCE WELDING MACHINE
Filed Jan. 11, 1957 2 Sheets-Sheet 2

INVENTOR.
WILLIAM M. WAKELEY

BY John W. Michael
ATTORNEY

United States Patent Office 2,905,804
Patented Sept. 22, 1959

2,905,804

MAGNETIC FORCE WELDING MACHINE

William M. Wakeley, Milwaukee, Wis., assignor to Acro Welder Mfg. Co., Milwaukee, Wis., a corporation of Wisconsin Application January 11, 1957, Serial No. 633,784

16 Claims. (Cl. 219—86)

This invention relates to a resistance welding machine of the type employing magnetic force for obtaining a supplementary pressure or forging force on the electrodes during the welding operation.

The principal object of this invention is to improve upon the ability of a resistance welding machine of the type described to maintain the desired electrode pressure during the welding operation.

Another object of this invention is to modify resistance welding machines of the type described to provide improved following action on the spindle or the moving electrode during the welding operation.

Throughout the development of this art, the usual design has pretty well standardized on the provision of an air cylinder or ram arrangement for holding the movable electrode on the work and for maintaining pressure between the electrodes during the welding operation. Due to the inherent nature of the air cylinder arrangement, it is virtually impossible to maintain the desired force between the electrodes after the welding operation has been initiated. Since the electrodes tend to reduce the thickness of the work it is necessary to move the movable electrode toward the stationary electrode in order to maintain the desired pressure. With modern technology, the resistance welding machine has evolved into one in which the duration of the welding cycle is extremely short and the inherent inertia of the air cylinder arrangement precludes obtaining the desired follow-up on the movable electrode.

As an improvement upon this arrangement, there has evolved the magnetic force type of resistance welding machine. This type of machine still employs the air cylinder or air ram for achieving the large motion on the electrode and for obtaining the desired initial pressure. However, the air cylinder force is augmented by a magnetic force when current is passed between the electrodes. Since the magnetic follow-up is faster than the air cylinder, the quality of the weld is much improved. The magnetic type still left something to be desired by reason of the forces which the magnetic force had to overcome in order to move the electrode. The present invention provides a means for greatly reducing the undesired forces opposing the magnetic action so the movement of the electrode is virtually instantaneous as any decrease in thickness of the work occurs. Thus, the present resistance welder maintains better pressure on the work throughout the welding operation than any other welder heretofore manufactured.

The prior magnetic type resistance welders were so designed that the armature, which was attracted to the stationary magnet and transferred the force of attraction to the electrode, was required to carry along parts of the air cylinder mechanism which introduced considerable friction and inertia. The present invention contemplates an arrangement whereby the electrode is effectively cut free of the air cylinder parts when the magnetic force is exerted on the electrode. Hence, the magnetic force does not have to overcome the friction and inertia of the air cylinder the response of the electrode is much faster and the pressure on the electrode is maintained throughout the welding operation. This arrangement has considerable advantage both during the normal magnetic force resistance welding and in the delayed forge type resistance welding as will be explained more fully hereinafter.

Other objects and advantages will be pointed out in, or be apparent from, the specification and claims, as will obvious modifications of the single embodiment shown in the drawings in which:

Figure 5:
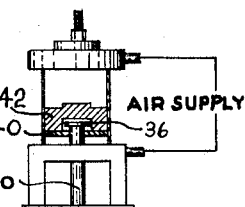

Figure 5 can be considered to be the completion of the forge welding or the end of regular welding.

Figure 3:
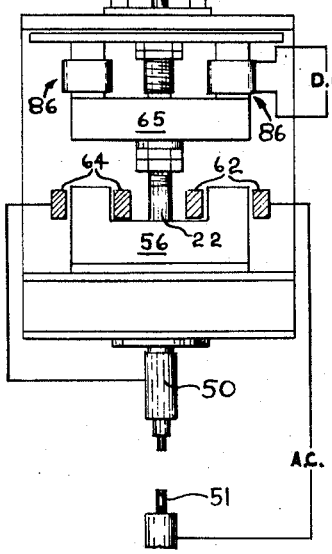
Figure 3 is a schematic showing of the machine with the electrode raised.
Figure 4:
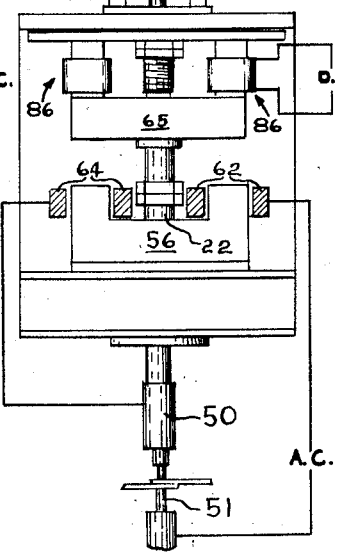
Figure 4 is similar to Figure 3 but shows the parts (in exaggerated positions) ready for delayed forge welding.

Referring to the drawings now in detail, the frame of the machine includes upper horizontal plate 10 and a lower bed including parallel horizontal plates 12 and 14. Flanged sleeve 16 is mounted in the lower bed plate 12 by screws 18 and supports ball bearing assembly 20 which guides the lower end of spindle or shaft 22. A similar flanged sleeve or bearing housing 24 is mounted in upper plate 10 by dowell pins 26 and supports bearing 28 which guides the upper end of shaft 22. The upper end of shaft 22 is connected to piston rod 30 by spring pin 32. The piston rod projects upwardly centrally of the piston guide 34 and terminates in head 36 which is received in cavity 38 formed by plate 40 secured to piston 42. The piston 42 moves vertically in cylinder 44 as air is admitted either above or below the piston. The piston seal cups 46, 46 must be employed but these inherently incur considerable friction which, as will be pointed out more fully hereinafter, with the present construction is no longer a factor during the welding operation. If air is admitted to the top side of the piston, piston will be moved down but will not actuate the piston rod 30 and sleeve 22 until surface 48 in cavity 38 contacts the top of head 36 (see Figure 4). At this time motion will be transmitted from the piston to the piston rod 30 and thus to spindle 22. If air is then admitted below the piston, the piston will first travel free until head 36 of piston rod 30 is engaged by the upper surface of guide 34 (see Figures 1 and 3). Thus, there is a lost motion at this point. It is this feature which permits the magnetic force to actuate the electrode without having to overcome the friction and inertia of the air ram arrangement. This will be explained more fully hereinafter.

Figure 1:
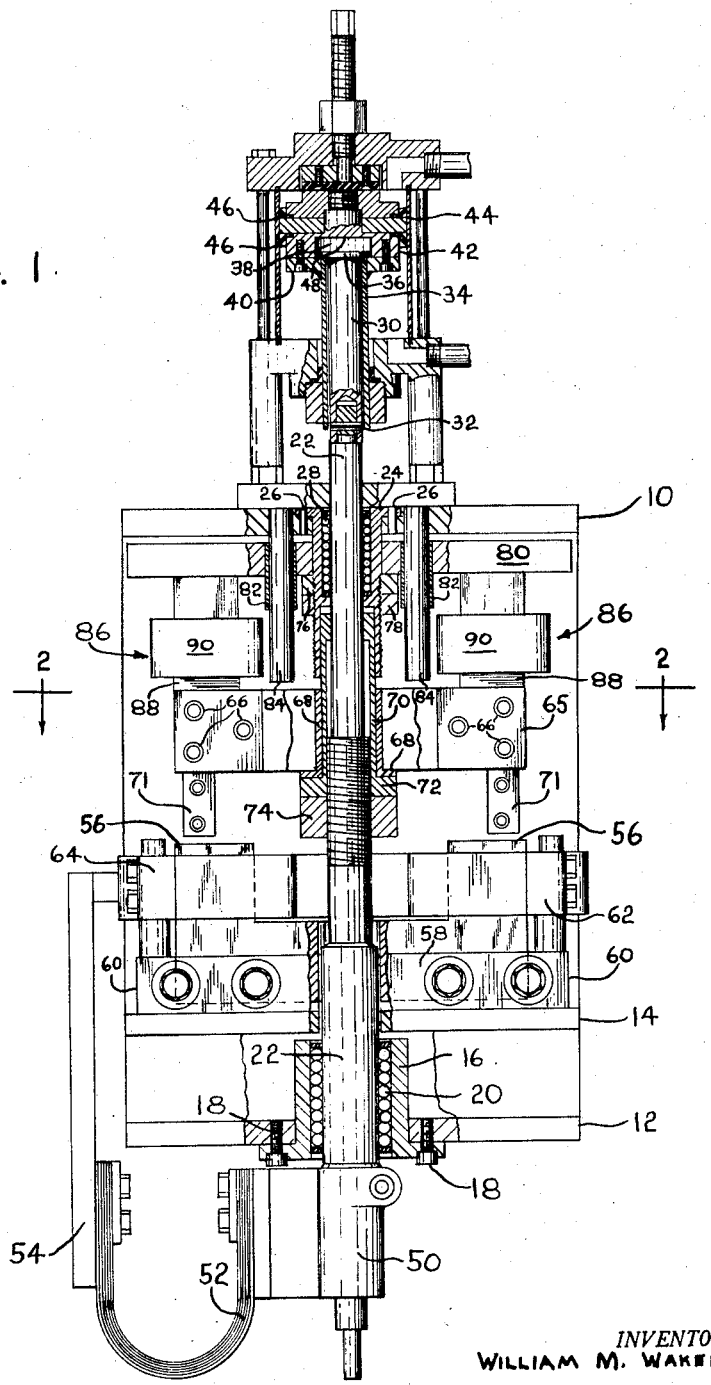
Figure 1 is a front elevation with parts in section to show the construction of the present machine.
Figure 2:
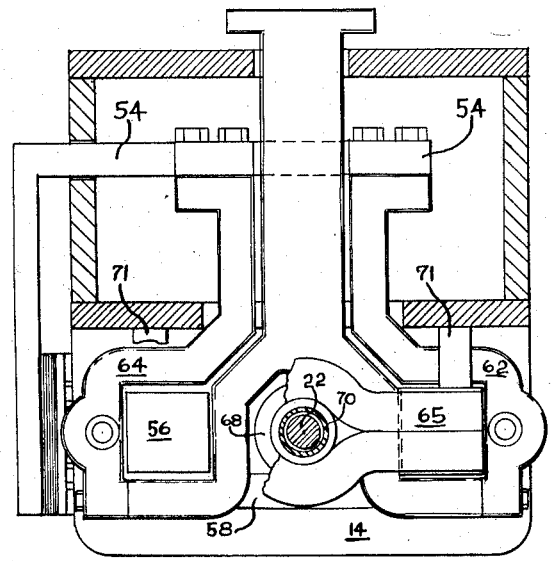
Figure 2 is a section in line 2—2 in Figure 1.

The lower end of spindle or shaft 22 carries electrode 50 which may be of the water cooled type and is provided with a connection through the usual flexible laminated connector 52 to bus bar 54. This is all quite conventional and need not be explained further to understand this invention. It will, of course, be understood that as the air ram moves the spindle 22 up and down the electrode is moved away from or towards the lower fixed electrode 51. Magnet core 56 is clamped on the top of lower bed plate 14 between side clamps 58 and end clamps 60 and is adapted to be energized when the windings 62, 64 around each pole are energized. These windings are actually a single turn of very heavy stock and are preferably water cooled since they are connected in series with the electrodes to be energized when current is passed through the electrodes. This connection comes off the back side of the windings and connects to the bus bar 54. When the current is passed between the electrodes the single winding around each pole of magnet 56 is also energized and the magnet will exert an attracting force on armature 65. This armature is made of two halves connected by the screws 66 and is provided with bushing 68 welded to the armature and adapted to slide on sleeve 70 projecting upwardly from adjusting nut 72 on which the bushing may rest as shown in Figure 1. Sleeve 70 provides a desirable diameter on which bushing 68 may ride in order to guard against canting of the armature on the spindle. Adjusting nut 72 may be adjusted up or down on the shaft to vary the spacing between the armature and the pole faces. It will be appreciated that the magnetic force between the magnet and the armature varies inversely with the square of the distance between the two. In no event is it desirable to have the armature rest on the pole face either before or at the completion of a welding cycle since at that time there would be no force transmitted to the spindle. If the adjusting nut 72 is positioned to place the armature quite close to the pole faces the magnetic force attracting the armature to the magnet would be quite large and this, of course, is transferred to the spindle through bushing 68 contacting the upper surface of adjusting nut 72. Lock nut 74 is provided to hold the adjustment. The armature is retained in alignment with the pole faces by guides 71 fixed on the frame.

It will be noted that upper bearing housing 24 is provided with a depending threaded sleeve portion on which adjusting nut 76 and lock nut 78 are positioned. The adjusting nut varies the position of cross-head 80 which is provided with bushings 82 slidably mounted on guide pins 84 carried by the upper frame plate 10. As the cross-head 80 is moved up or down, the position of the direct current electromagnets 86 is varied with respect to the armature 65. The D.C. magnets have a central core 88 and winding 90. The windings 90 are adapted to be separately energized to obtain a predetermined flux density exerting in turn, a predetermined attractive force on armature 65. With this arrangement, the armature can be lifted on the sleeve portion 70 of the adjusting nut 72 prior to energization of the A.C. magnet during the resistance welding cycle. This is shown on an exaggerated scale in Figure 4 where the gap between the armature and the lower magnet is actually much too great. Since the flux density and the D.C. magnet will give a known attraction force on the armature 65, it is then a simple matter to adjust the D.C. magnets and thus the armature with respect to the A.C. magnet to predetermine the time after the cycle has started at which point the attraction force exerted by the A.C. magnet will overcome the force of attraction of the D.C. magnet and will bring the armature 65 down towards the A.C. magnet to deliver a hammer-like blow through the adjusting nut 72 to the spindle 22 and thus to the electrode. The completion of this action is shown in Figure 5. This type of welding is termed delayed forge welding. It will be appreciated that prior to the delivery of the hammer-like blow the air cylinder will exert force on the electrode.

Whether the type of welding performed is the conventional resistance weld or delayed forge welding there will be some reduction in the thickness of the work during the welding process. The magnetic type resistance welder made a great contribution to this art insofar as it proved more responsive to the movement requirement than did the simple air cylinder arrangement employed in the past. The present arrangement improves on the conventional magnetic resistance welder due to the lost motion connection between the piston 42 and the piston rod 30. Thus, when the piston is actuated to move the electrode down onto the work and to exert the initial pressure the system is no longer dependent upon the air cylinder for maintenance of this force during the follow-up action. Indeed, when the electrode is moved it may move free of the piston. Thus, when the piston has moved the electrode down onto the work, head 36 on piston rod 30 at the upper end of spindle 22 will butt against the surface 48 on the underside of piston 42. Now when the armature moves under either type of welding technique it may deliver its force to the spindle and move just the spindle and piston rod without having to pick up and carry along with it the piston assembly which, as mentioned above, has considerable inertia and has considerable frictional engagement with the cylinder 44. This can be seen in Figure 5 where the gap between head 36 and surface 48 is exaggerated. By thus reducing the resistance (friction and inertia) to motion, a faster response of the electrode is achieved. The initial force exerted by the air cylinder, as mentioned above, may run as high as 400 pounds and the present system can easily maintain that force throughout the welding cycle even though this cycle may be only $\frac{1}{120}$ second. Under the delayed forge technique, this supplementary force may actually be as high as 12,000 pounds. (This is estimated since it is extremely difficult to measure such a force of such short duration.) The order of magnitude of movement of the spindle during the welding process will seldom rise above $\frac{1}{16}$ of an inch. This is not a large amount of movement, but on the other hand, when the very short duration of the welding cycle is considered it will be appreciated that the system must be freed of inertia and friction wherever possible in order to achieve the fastest response possible.

Since the present structure does not involve overcoming the inertia of the ram the pressures obtained are much more consistent than with former magnetic force machines. This is of great importance in obtaining uniformly high quality. Throughout this description the magnetic circuit has been described as being in series with the welding circuit so that the supplementary force is simultaneous with the welding current or delayed as in the forge action described. There may be instances when the supplementary force is desired at even a different time but when the present invention is still of importance. Therefore, the present invention is not to be construed as limited to the series circuit arrangement just described.

It will be appreciated that the forge action may be optional in a welding machine. For this reason the present invention is not to be considered as limited to use with this feature. Nor is this invention limited to use in combination with the air cylinder arrangement since other arrangements may profitably be used for moving the spindle to and from the work. It seems quite clear that in any event there must be some mechanical or electromechanical or hydraulic system for moving the spindle to and from the work and all of these systems encounter inertia and friction which is desirably disengaged from the spindle when the spindle receives its supplementary force from the armature. Similarly there may be other arrangements for imparting this supplementary force to the spindle. With these thoughts in mind. it will be appreciated that the present invention is to be limited only by the scope of the claims and not by the scope of the drawings and description.

I claim:

1. A resistance welding machine comprising a movable electrode, means supporting said electrode, a fixed electrode, means for moving the movable electrode toward or from the fixed electrode, a first force applying means for exerting a force on the movable electrode tending to move it towards the fixed electrode when the movable electrode has been moved against a workpiece sandwiched between the fixed and movable electrodes, a magnetic force applying means for applying a force to the movable electrode tending to move it towards the fixed electrode to clamp a workpiece positioned between the electrodes, and means for shifting the source of force effective on the movable electrode from the first force applying means to the magnetic force applying means concurrently with the application of welding current to the electrodes.

2. A resistance welding machine comprising means supporting a movable electrode, a fixed electrode, means for moving the movable electrode towards or from the fixed electrode, a first and a second force applying means for exerting axial force on the movable electrode, means operatively connecting the first and the second force applying means to the movable electrode respectively at points spaced longitudinally of the movable electrode supporting means, the connection means between the first and second force applying means and the movable electrode including means for shifting the source of useful force on the electrode from the first force applying to the second force applying means.

3. A resistance welding machine comprising, means supporting an electrode for movement toward and from the work, means for moving the electrode toward and from the work, means for exerting an initial force on the electrode when the electrode has been brought into contact with the work, means operable during passage of current through said electrode to impart a supplementary force on the electrode in the direction tending to move the electrode toward the work, and means for disengaging the electrode from said moving means and from said initial force exerting means during application of the supplementary force.

4. A welding machine comprising, a frame, an electrode mounted in the frame for movement to and from the work, means for moving the electrode to and from the work and for biasing the electrode toward the work with a pre-determined force after the electrode has been brought into contact with the work, magnetic means operable during passage of current to the electrode to exert a supplementary force on the electrode, and means for disengaging the electrode from said moving and biasing means during application of the supplementary force.

5. A welding machine comprising, a frame, an electrode mounted in the frame for movement to and from the work, moving and biasing means, means connecting the electrode to the moving and biasing means, the moving and biasing means being operable to move the electrode toward and from the work and to exert a bias on the electrode in the direction toward the work after the electrode has been brought into contact with the work, means operative during passage of current to the electrode to exert a supplementary force on the electrode to maintain the desired contact pressure between the electrode and the work, said connecting means permitting disengagement of the electrode from the moving and biasing means during application of the supplementary force.

6. A welding machine according to claim 5 in which the connecting means comprises a lost motion connection.

7. A welding machine according to claim 6 in which the supplementary force exerting means comprises magnetic means which are energized simultaneously with the passage of current to the electrode.

8. A welding machine comprising, a frame, an electrode mounted in the frame for movement to and from the work, air ram means adapted to move the electrode to and from the work and to exert an initial force biasing the electrode toward the work after the electrode has been brought into contact with the work, means connecting the air ram to the electrode, means for exerting a supplementary force on the electrode during the welding operation and independently of the air ram means, said connecting means permitting movement of the electrode toward the work under influence of the supplementary force exerting means independently of the air ram means.

9. A welding machine according to claim 8, in which the supplementary force exerting means includes magnetic means in electrical circuit with the electrode for simultaneous energization with the electrode.

10. A welding machine according to claim 9, in which the connecting means comprises a lost motion connection between the air ram means and the electrode.

11. A welding machine comprising, a frame, a spindle mounted in the frame for movement to and from the work, an electrode carrier positioned at one end of the spindle, air ram means carried by the frame, means connecting the air ram means to the spindle so the spindle may be moved by the air ram means to or from the work and biased by the air ram toward the work to obtain the initial pressure between the electrode and the work, a magnet carried by the frame and including a coil in series with the electrode for simultaneous energization therewith, an armature carried on and engageable with the spindle and positioned to be attracted by said magnet when the magnet coil is energized to impart a supplementary force on the spindle urging the spindle toward the work in order to maintain the desired pressure between the electrode and the work during the welding operation, said connecting means permitting disengagement of the spindle from the air ram means during application of said supplementary force by the magnet means acting on the armature.

12. A welding machine according to claim 11 in which the connecting means comprises a lost motion connection.

13. A welding machine according to claim 12, in which the lost motion means includes a head on the spindle engageable with the piston of the air means at axially spaced points.

14. A resistance welding machine comprising, means supporting an electrode for movement toward and from the work, means for moving the electrode toward and from the work, means to impart a force on the electrode in the direction tending to move the electrode toward the work, and means for disengaging the electrode from said moving means during application of the force.

15. A welding machine comprising, a frame, an electrode mounted in the frame for movement to and from the work, means for moving the electrode to and from the work, magnetic means operable to exert a supplementary force on the electrode, and means for disengaging the electrode from said moving means during application of the supplementary force.

16. A welding machine comprising, a frame, an electrode mounted in the frame for movement to and from the work, moving means, means connecting the electrode to the moving means, the moving means being operable to move the electrode toward and from the work, means operative to exert a supplementary force on the electrode, said connecting means permitting disengagement of the electrode from the moving means during application of the supplementary force.

References Cited in the file of this patent

UNITED STATES PATENTS

| | | |
|---|---|---|
| 2,312,938 | Stieglitz | Mar. 2, 1943 |
| 2,358,826 | Purat | Sept. 26, 1944 |
| 2,464,967 | Dinnick | Mar. 22, 1949 |
| 2,476,187 | Gordon | July 12, 1949 |
| 2,776,362 | Welch | Jan. 1, 1957 |